United States Patent [19]

Budde et al.

[11] Patent Number: 4,473,880
[45] Date of Patent: Sep. 25, 1984

[54] ARBITRATION MEANS FOR CONTROLLING ACCESS TO A BUS SHARED BY A NUMBER OF MODULES

[75] Inventors: David L. Budde, Portland; David G. Carson, Hillsboro, both of Oreg.; Stephen R. Colley, San Jose, Calif.; David B. Johnson; Robert P. Voll, both of Portland; Doran K. Wilde, Aloha, all of Oreg.

[73] Assignee: Intel Corporation, Santa Clara, Calif.

[21] Appl. No.: 342,837

[22] Filed: Jan. 26, 1982

[51] Int. Cl.³ .................. G06F 3/00; H04J 6/00
[52] U.S. Cl. ................................................ 364/200
[58] Field of Search ............... 364/200, 900; 370/91; 340/825.5

[56] References Cited

U.S. PATENT DOCUMENTS

| | | | |
|---|---|---|---|
| 4,034,347 | 7/1977 | Probert, Jr. | 364/200 |
| 4,281,381 | 7/1981 | Ahuja et al. | 364/200 |
| 4,293,783 | 10/1981 | Patil | 364/716 X |
| 4,365,294 | 12/1982 | Stokken | 364/200 |
| 4,409,656 | 10/1983 | Andersen et al. | 364/200 |
| 4,420,806 | 12/1983 | Johnson, Jr. et al. | 364/200 |

Primary Examiner—Jerry Smith
Assistant Examiner—William G. Niessen
Attorney, Agent, or Firm—Owen L. Lamb

[57] ABSTRACT

An arbitration mechanism comprising a request FIFO (408) for storing ones and zeros corresponding to received requests in the order that they are made. A one indicates that the request was made by the module in which the FIFO is located, and a zero indicates that the request was made by one of a number of other similar modules. The request status information from the other modules is received over signal lines (411) connected between the modules. This logic separates multiple requests into time-ordered slots, such that all requests in a particular time slot may be serviced before any requests in the next time slot. A store (409) stores a unique logical module number. An arbiter (410) examines this logical number bit-by-bit in successive cycles and places a one in a grant queue (412) upon the condition that the bit examined in a particular cycle is a zero and signals this condition over the signal lines. If the bit examined in a particular cycle is a one, the arbiter drops out of contention and signals this condition over the signal lines (411). This logic orders multiple requests within a single time slot, which requests are made by multiple modules, in accordance with the logical module numbers of the modules making the requests. The grant queue (412) stores status information (ones and zeros) corresponding to granted requests in the order that they are granted—a one indicating that the granted request was granted to the module in which the grant queue is located, and a zero indicating that the granted request was granted to one of the other modules. The granted request status information from the other modules is received over the signal lines (411). This logic separates multiple granted requests such that only one request corresponding to a particular module is at the head of any one grant queue at any one time.

6 Claims, 4 Drawing Figures

ARBITRATION MEANS FOR CONTROLLING ACCESS TO A BUS SHARED BY A NUMBER OF MODULES

CROSS-REFERENCES TO RELATED APPLICATIONS

Application Ser. No. 296,025, "Method and Apparatus of Fault-Handling in a Multiprocessing System," by David Budde et al, filed on Aug. 25, 1981 and assigned to Intel Corporation, now U.S. Pat. No. 4,438,494 issued Mar. 20, 1984; and Application Ser. No. 336,866, "Interface for Use between a Memory and Components of a Module Switching Apparatus" of David Budde et al, filed on Jan. 4, 1982.

FIELD OF THE INVENTION

This invention relates to multiprocessing systems, and more particularly to an arbitration mechanism for coordinating requests for access to and replies received on a common bus interconnecting a plurality of modules.

As more and more complex functions are incorporated into microprocessor chips, the number of pins dedicated to arbitration between the units and to interface functions, such as interrupts, status signaling, and data transfer between the units, becomes more critical. It is therefore desirable to substantially reduce the number of bus lines and other pins utilized for arbitration and information transfer while maintaining a simplified data transfer protocol between the microprocessor and attached memory units.

BRIEF DESCRIPTION OF THE DRAWINGS

The foregoing and other objects, features, and advantages of the invention will be apparent from the following detailed description of a preferred embodiment of the invention as illustrated in the accompanying drawings wherein.

SUMMARY OF THE INVENTION

Figure 1:
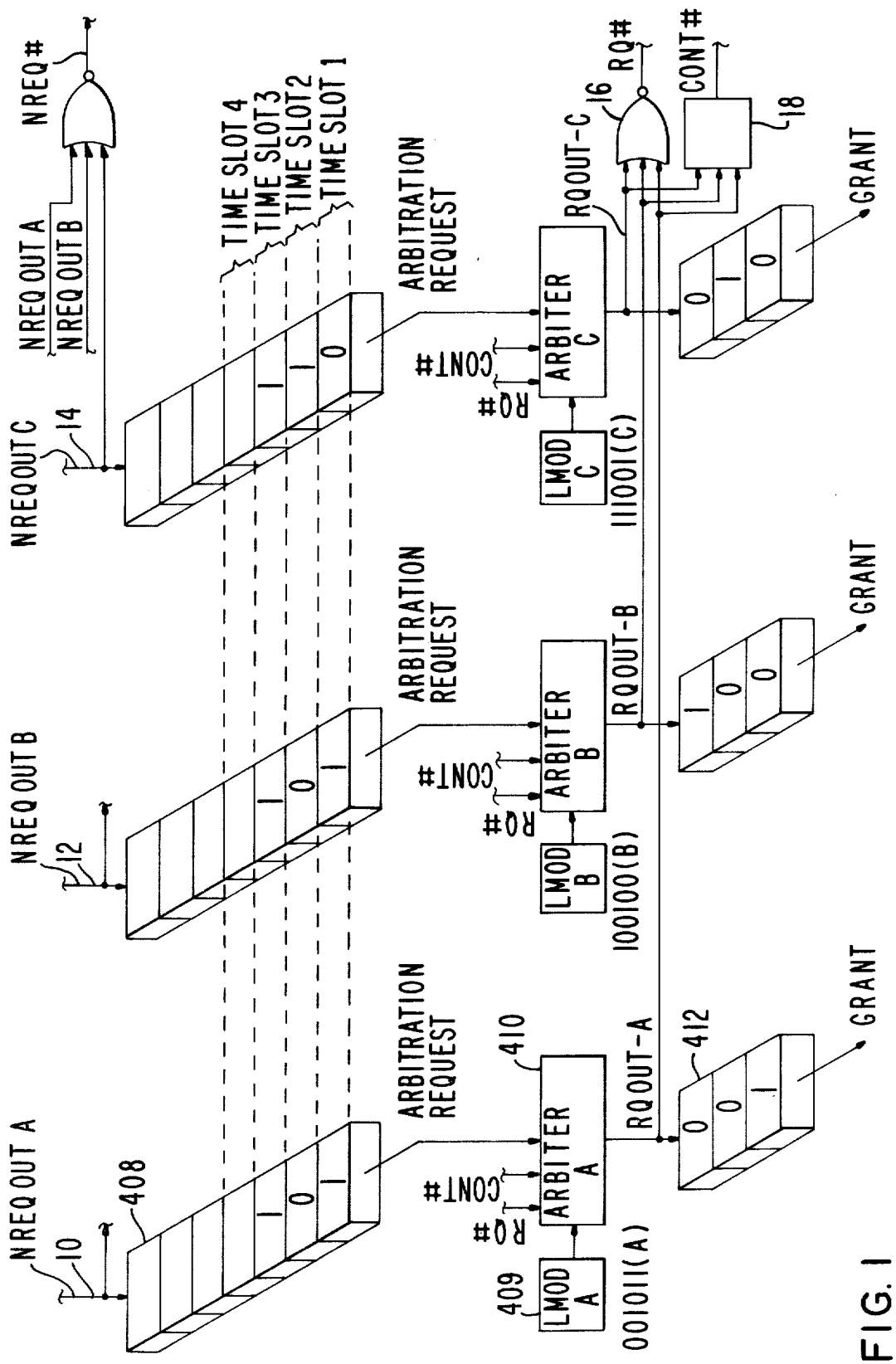
FIG. 1 is a diagram illustrating the flow of requests and grants within an arbitration mechanism employing the principles of the present invention.

Briefly, the invention is concerned with a microprocessor multiline bus interface, including a multiline address/control/data (MACD) bus to which a number of modules are connected in parallel, and signaling means for signaling between said modules. Each one of the modules is assigned a unique logical module number, and includes therein a binary arbitration mechanism. The binary arbitration mechanism provides the means for granting exclusive use of said bus to one of said number of modules in response to a received request for access to said bus.

The arbitration mechanism comprises a time-ordered, first-in-first-out (FIFO) queue for storing new request status information (ones and zeros) corresponding to received requests in the order that they are made. A one indicates that the request was made by the module in which the FIFO is located, and a zero indicates that the request was made by one of the number of other modules. The request status information from the other modules is received over signal lines connected between the modules. This logic separates multiple requests into time-ordered slots, such that all requests in a particular time slot may be serviced before any requests in the next time slot. A register in a module stores the unique logical module number of the module in which said store is located. An arbiter in the module examines this logical number bit-by-bit in successive cycles and places a one in a grant queue in the module upon the condition that the bit examined in a particular cycle is a zero and signals this condition over the signal lines to all the other modules. If the bit examined in a particular cycle is a one, the arbiter drops out of contention and signals this condition over the signal lines to all the other modules. This logic, in conjunction with similar logic which is replicated in each module, orders multiple requests within a single time slot, which requests are made by muliple modules, in accordance with the logical module numbers of the modules making the requests. The grant queue stores status information (ones and zeros) corresponding to granted requests in the order that they are granted—a one indicating that the granted request was granted to the module in which the grant queue is located, and a zero indicating that the granted request was granted to one of the other modules. The granted request status information from the other modules is received over the signal lines. This logic, in conjunction with similar logic which is replicated in each module, separates multiple granted requests such that only one request corresponding to a particular module is at the head of any one grant queue at any one time.

In accordance with an aspect of the invention, the signaling means for signaling between the modules includes a NREQOUT output line from each module, connected through a first constant current source to a NREQ# line, such that the NREQOUT line from any one module being asserted will cause the NREQ# line to be asserted. The signaling means also includes a RQOUT output line from each module, connected through a second constant current source to a RQ# line, such that the RQOUT line from any one module being asserted will cause the RQ# line to be asserted. The RQOUT line is further connected through a third constant current source to a CONT# line, such that the RQOUT lines from two or more modules being asserted will cause the CONT# line to be asserted.

DETAILED DESCRIPTION

Refer to FIG. 1 which is a diagram illustrating the flow of requests and grants within an arbitration mechanism employing the principles of the present invention. Time ordering is the first stage of arbitration for new requests (10, 12, 14) coming from sources of requests, such as processors A, B and C, respectively. If there are 31 processors that can make requests, each module requires 1-bit by 31 deep time-ordering queue to implement time ordering. For simplicity, only 7 stages of time-ordering queue are shown in FIG. 1.

When a module receives a new request from its processor, the module signals this fact to the other modules by asserting the NREQOUT (New Request Out) line.

External to the module, NREQOUT is OR-tied to the NREQ# line.

NREQ# goes low (becomes asserted) any time a new request is received by any module along the bus. With respect to the time-ordered queue (408), every cycle that NREQ# is low defines a new time-order slot. When a module sees that NREQ# is asserted, it pushes a one onto the time-ordered queue if it just asserted NREQOUT; otherwise, it pushes a zero onto the time-ordered queue. All three modules in FIG. 1 push their respective time-ordered queue at the same time, pushing a one if they have a request in that particular time-order slot and a zero if they do not. The queues thusly operate in parallel.

The bit at the head of each of the time-ordered queues is called ARBREQ (Binary Arbitration Request) and it indicates to the binary arbiter (410) that the module needs to participate in binary arbitration. In those non-contended cases where there is only a single request per time-order slot, (for example, slot 2 in FIG. 1), binary arbitration is extremely simple; a grant is issued to that request immediately.

When contention between several requests does arise, as is the case between the requests for modules A and B at the head (slot 1) of the queues in FIG. 1, binary arbitration starts narrowing down contenders until a winner is found. To accomplish this, each module utilizes its unique 6-bit logical module number (LMOD). The binary arbitration state machine (410) asserts RQOUT (Request Out) when it receives ARBREQ from the time-ordered queue (408). RQOUT is an output asserted by the module's binary arbitration machine (410) to indicate to other modules that it is contending for access to the bus. The binary arbitration state machine (410) examines RQ# (Request), an input coming from OR logic (16) which OR-ties all the RQOUT lines from modules A, B, and C. The binary arbitration state machine (410) also examines CONT# (Contention), an input which is pulled down by logic (18) upon the condition that two or more RQOUT lines are asserted, signifying that two or more modules are contending for access to the bus. When two or more modules contend, binary arbitration may take a number of cycles to determine which module will be granted access to the bus. At each successive cycle, each module's binary arbiter machine scans the next bit in its respective logical module number to make a decision as to whether it should continue to arbitrate or concede to another module with a higher priority logical module number. Logical module numbers are scanned from most significant bit (MSB) to least significant bit (LSB) at at each bit position, modules with zeros in their numbers win out over those with ones. In the example shown in FIG. 1, module A has a logical module number of 001011, module B has a logical module number of 100100, and module C has a logical module number of 111001.

In the first time slot, requests from modules A and B are in contention for the bus. It will take several cycles of the arbitration machine within the arbiters to resolve the contention. This process is described in detail subsequently with reference to FIGS. 2 and 3. Module A wins the first grant, signified by a one in at the head of its grant queue, and a zero at the head of the other two grant queues. Module A gains access to the bus first. Module B wins the second grant, signified by a one in the second stage of its grant queue, and a zero in the second stages of the other two grant queues.

In the second time slot, a request from module C exists only; there is no contention for the bus. Module C wins the grant immediately, there being no need to invoke the arbiter and grant queue mechanism.

In the third time slot, requests from modules A, B and C are in contention for the bus. It will take several cycles of the arbitration machine within the arbiters to resolve the contention. Module A will win the first grant, signified by a one at the head of its grant queue, and a zero at the head of the other two grant queues. Module A will gain access to the bus first. Module C, in contention with module B, will win the second grant, signified by a one in the second stage of its grant queue, and a zero in the second stages of the other two grant queues. Module C will gain access to the bus secondly. Module B, the final contender in the second time slot, will win the third grant, signified by a one in the third stage of its grant queue, and a zero in the third stages of the other two grant queues. Module B will gain access to the bus thirdly.

As bus accesses are performed, the grant queue is emptied, and granted requests are pushed to the head of the grant queue, to make room for newly-granted requests to be queued until all the requests in a time slot have been serviced.

Figure 2:
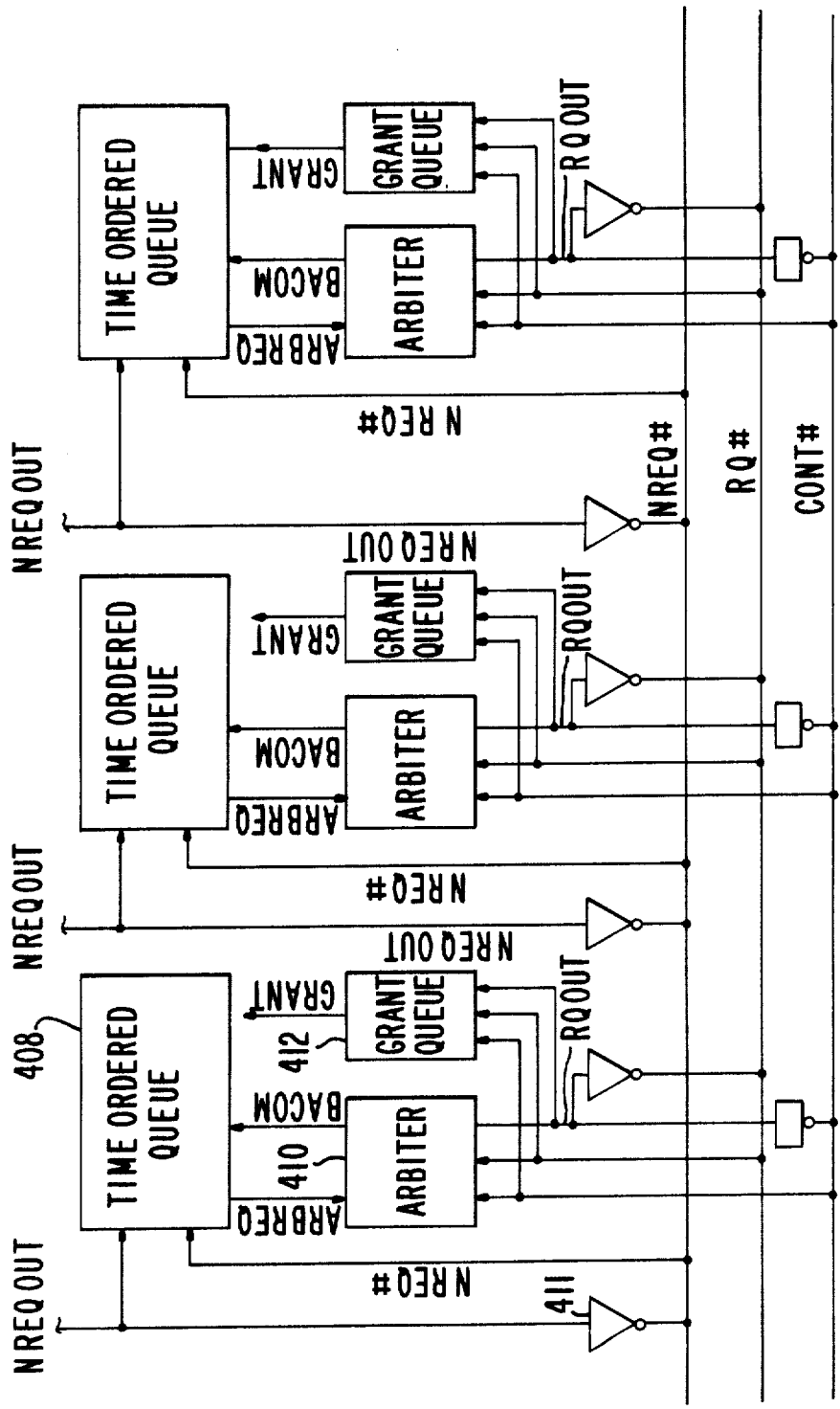
FIG. 2 is a functional block diagram illustrating how modules employing an arbitration mechanism of the present invention may be connected together.

Refer now to FIG. 2 which is a functional block diagram showing how modules employing an arbitration mechanism, such as described above with respect to FIG. 1, may be connected together. How the arbitration mechanism is connected in a system is described in U.S. Pat. No. 4,438,494, "Method and Apparatus of Fault-Handling in a Multiprocessing System," by David Budde et al, and copending application Ser. No. 336,866, "Interface for Use Between a Memory and Components of a Module Switching Apparatus", of David Budde et al, and the applications referred to therein. Each module is composed of three state machines, a time-ordered queue (408), an arbiter (410), and a grant queue (412).

The time-ordered queue (408) separates requests (NREQOUT) into time-order slots and assures that all requests in a particular time-order slot are serviced before any requests in the next time-order slot. The time-ordered queue also generates the internal line ARBREQ to the arbiter machine (410) to submit a received request to arbitration if there are other requests in the same time slot contending for access to the bus.

The energization of NREQOUT causes other bus interface units to be informed via the NREQ# signal of a new processor request. Assertion of this signal causes all modules to queue up a new time-ordering cycle. As requests are satisfied the time-ordering queue (408) will dequeue cycles.

The grant queue (412) queues up access grants by monitoring and decoding the state of the RQ# and CONT# lines. The bus access right is signaled by the grant line from the grant queue (412).

Figure 3:
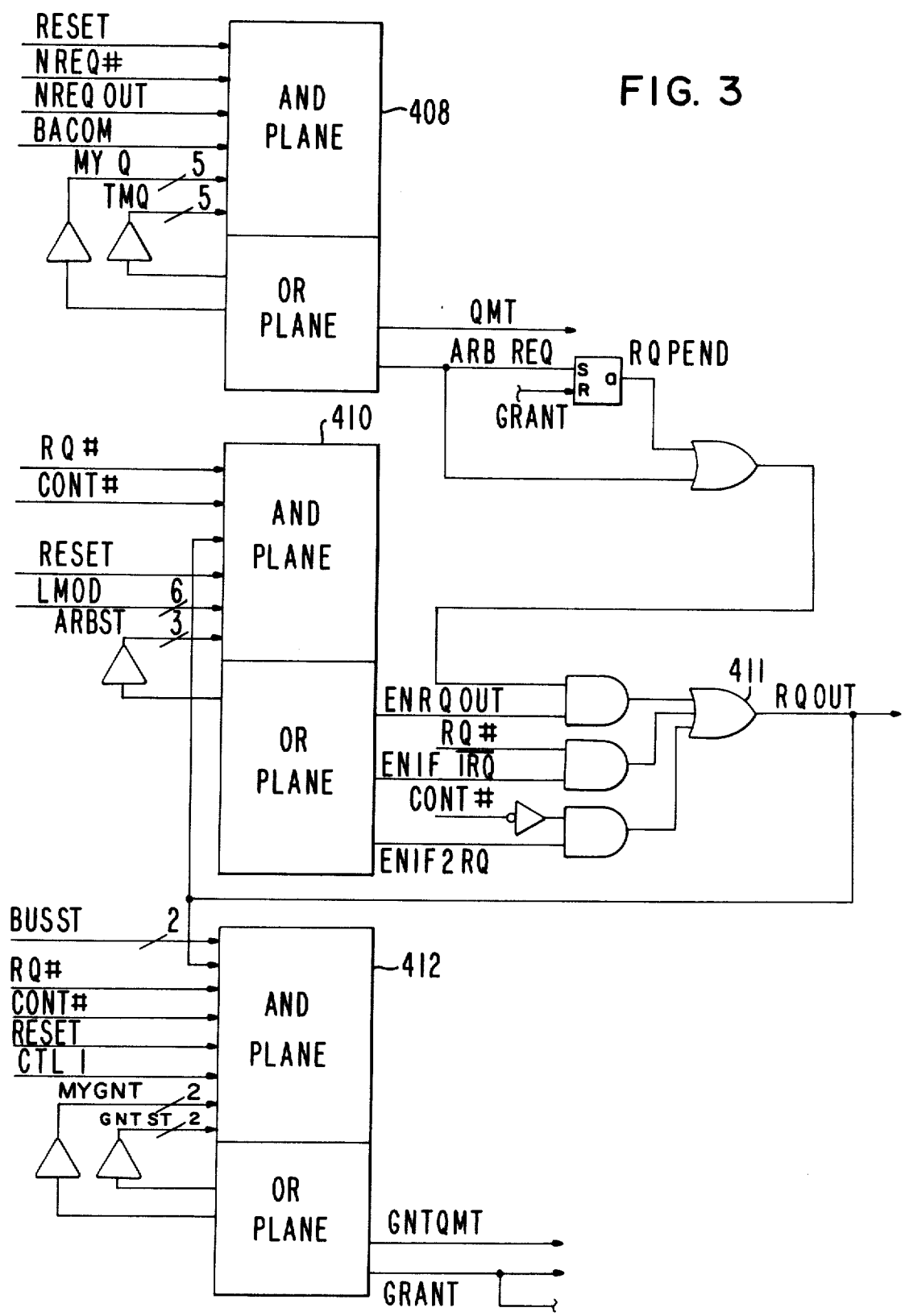
FIG. 3 is a more detailed diagram of the time-ordered queue state machine, binary arbiter state machine, and the grant queue state machine, shown in FIG. 2; and, FIG. 4 is a state diagram of the logic within the binary arbiter state machine shown in FIG. 3.

Refer now to FIG. 3 which is a more detailed diagram of the time-ordered queue state machine, binary arbiter state machine, and the grant queue state machine, shown in FIG. 2. Three different programmable logic arrays (PLAs) which implement three levels of arbitration are shown. The first level of arbitration (408) is a time-ordering queue which represents two five-bit counters, one called time queue (TMQ), and one called my queue (MYQ). The time queue keeps track of all outstanding requests that are in the time-ordering queue. MY queue is a value which marks this particular bus interface unit's slot in the time-ordered queue. Whenever the NREQ# signal is asserted, the time queues are incremented. Whenever BACOM is asserted, which means binary arbitration is complete, the time queues and MY queues are decremented.

Whenever the NREQ# signal is asserted, and this bus interface unit caused the assertion by itself having asserted the NREQOUT signal, it inserts the value of the bits currently in the time queue counter into its MY queue counter, which marks its slot in the time-ordered queue.

There are two signals that come out of the PLA (408). One is called queue empty (QMT), which indicates that the decoded value of the time queue is zero. The other signal is ARBREQ which indicates that MY queue has decremented down to zero and it's this unit's turn to arbitrate for the bus.

The second level of arbitration (410) is initiated if there is contention for the bus. ARBREQ in each unit causes RQOUT to be asserted. The RQOUT lines from each unit are ORed together, such that any one being asserted will cause RQ# to be asserted. Either ARBREQ asserted by this unit or any other unit, as signaled by RQ#, via OR (411), will initiate the second level of arbitration.

A unique six-bit logical number (LMOD) is assigned to each unit. There are three arbitration state bits, ARBST, which keep track of a binary search of this logical number, that is, what part of the binary search that this unit's arbiter (410) is working on.

The six-bit logical module number bits (LMOD) establish the priority of this unit with respect to other units currently contending for the bus. If the CONT# signal is asserted on the first cycle of an arbitration, the PLA machine (410) is started and does a search through the logical module number starting at bit six and working down through bit zero. On subsequent bits, the PLA will either cause assertion or unassertion of the RQOUT line for that particular cycle. Through this mechanism bus interface units are deallocated from this particular arbitration until one unit of highest priority remains and is given a grant. Then a second round of arbitration will occur. The process is repeated until all bus interface units that are arbitrating in this time-ordering cycle have been given a grant.

The third level of arbitration is the grant queue (412). The grant queue PLA machine works in a manner similar to the time-ordering queue (412). The grant queue includes a decoder that monitors and decodes the state of the inputs CONT# and RQ#. There are two signals that come out of the PLA (412). One is called grant queue empty (GNTQMT), which indicates that the decoded value of the grant state (GNTST) is zero. The other signal is GRANT which indicates that the MY grant (MYGNT) queue has decremented down to zero and it's this unit's turn to use the bus. Every time a grant is given to any unit, the grant state is incremented. If the grant is given to this unit, based on the fact that this unit asserted the RQOUT line and there was a grant, then this unit marks that as being its grant. The grant queue empty (GNTQMT), is similar to the queue empty signal in the time-ordering queue, and the grant signal is similar to the ARBREQ signal in the time-ordering queue.

When contention between several requests does arise, binary arbitration starts narrowing down contenders until a winner is found. To accomplish this, each module utilizes its unique 6-bit logical module number. The binary arbitration state machine (410) asserts RQOUT when it receives ARBREQ from the time-ordered queue (408) to indicate to other modules that it is contending for access to the bus. The RQOUT lines from each module are OR-tied to the RQ# line. The RQ# line is input to each module. The binary arbitration state machine (410) examines CONT# (Contention), an input which is pulled down upon the condition that two or more RQOUT lines are asserted, signifying that two or more modules are contending for access to the bus. Together RQ# and CONT# have the following meaning:

| RQ# | CONT# | MEANING |
|---|---|---|
| 1 | 1 | No one is making a request |
| 0 | 1 | One module is making a request and it gets a GRANT |
| 0 | 0 | Two or more modules are contending. |

The fourth combination can never validly occur. When two or more modules contend, binary arbitration may take a number of cycles to determine which module will be granted access to the bus. At each successive cycle, each module's arbiter examines the next bit in its respective logical module number to make a decision as to whether it should continue to arbitrate or concede to another module with a higher priority logical module number. Logical module numbers are examined from most significant bit (MSB) to least significant bit (LSB) and at each bit position, modules with zeros in their numbers win out over those with ones.

Figure 4:
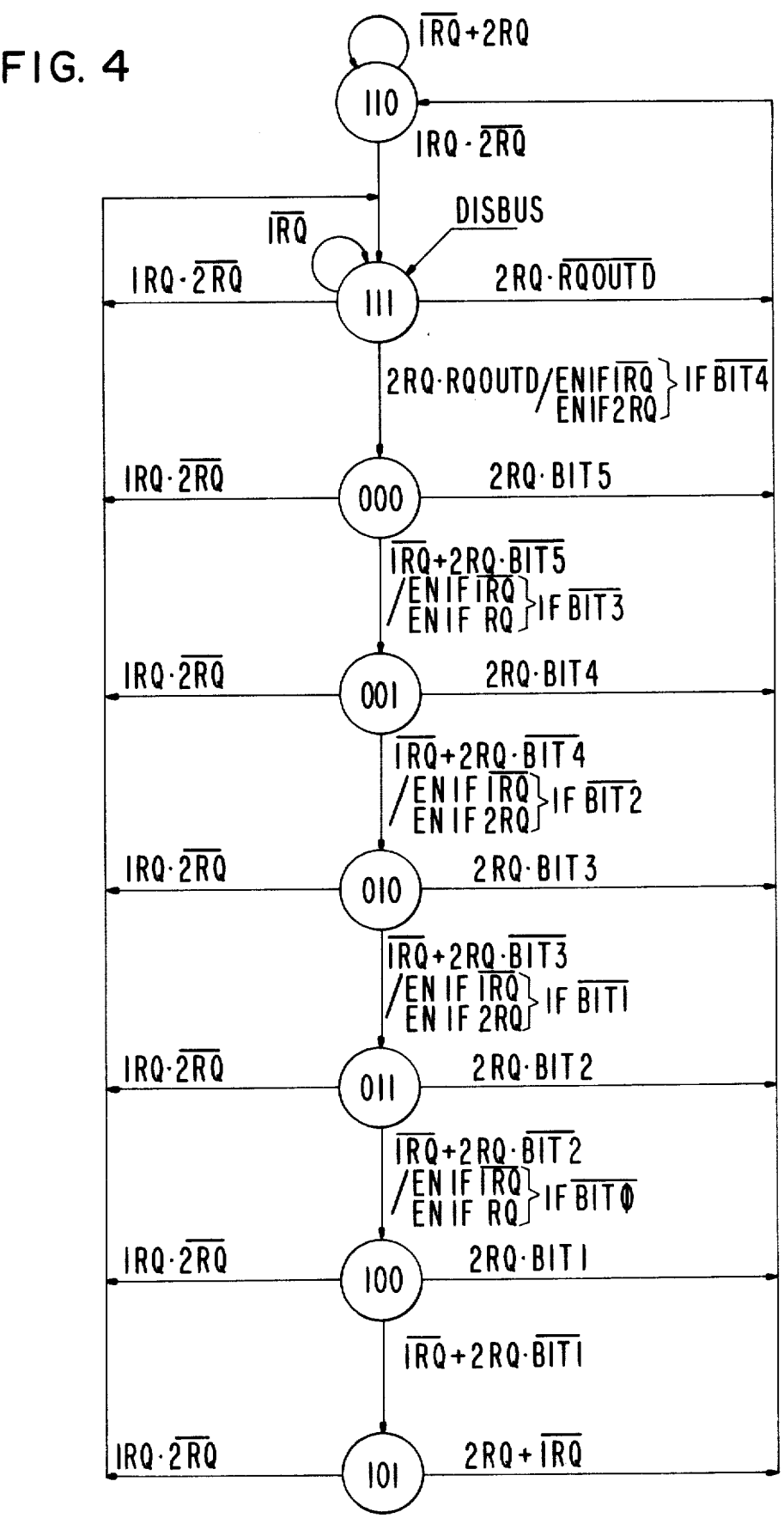

Referring to FIG. 4, the sequence of operation of the PLA (410) will now be described. (The notation used in this figure is that a statement after a slash means that the line stated is an output asserted, the notation 1RQ refers to the line RQ#, and the notation 2RQ refers to the line CONT#.)

The PLA machine (410) is initially in its idle state (111) and waits until the assertion of two requests (2RQ). (In FIG. 4 the notation 2RQ is the equivalent of CONT# which is asserted when two or more requests (RQOUTs) are asserted.) If the PLA sees two requests asserted and this unit did not make a request (its RQOUT is not asserted), then the PLA goes to a loser state (110), because the unit does not need to arbitrate.

If 1RQ is asserted and 2RQ is not asserted, no other units are contending, the machine stays in the idle state (111) and this unit gets an immediate grant. If the PLA sees two requests asserted and this unit did make a request (its RQOUT is asserted), then the PLA goes to an arbitrating state (000). In this state and each of the subsequent states, a different bit of this unit's logical number is examined to determine whether or not this unit is permitted to continuue to arbitrate, or yield priority to a contending unit of higher priority. A zero in a particular bit position will win out over other units having a one in the same position.

Starting from the state (000), if bit 5 is a one and 2RQ is asserted, the PLA goes to the loser state (110). If 1RQ is asserted but 2RQ is not asserted, the PLA goes to the state (111) and is given a grant. If bit 5 is a zero, and 2RQ is asserted or 1RQ is not asserted, the PLA goes to the next state (001) to continue arbitrating, narrowing down contenders.

Starting from the state (001), if bit 4 is a one and 2RQ is asserted, the PLA goes to the loser state (110). If 1RQ is asserted but 2RQ is not asserted, the PLA goes to the state (111) and is given a grant. If bit 4 is a zero, and 2RQ is asserted or 1RQ is not asserted, the PLA goes to the next state (010).

Starting from the state (010), if bit 3 is a one and 2RQ is asserted, the PLA goes to the loser state (110). If 1RQ is asserted but 2RQ is not asserted, the PLA goes to the state (111) and is given a grant. If bit 3 is a zero, and 2RQ is asserted or 1RQ is not asserted, the PLA goes to the next state (011).

Starting from the state (011), if bit 2 is a one and 2RQ is asserted, the PLA goes to the loser state (110). If 1RQ is asserted but 2RQ is not asserted, the PLA goes to the state (111) and is given a grant. If bit 2 is a zero, and 2RQ is asserted or 1RQ is not asserted, the PLA goes to the next state (100).

Starting from the state (100), if bit 1 is a one and 2RQ is asserted, the PLA goes to the loser state (110). If 1RQ is asserted but 2RQ is not asserted, the PLA goes to the state (111) and is given a grant. If bit 1 is a zero, and 2RQ is asserted or 1RQ is not asserted, the PLA goes to the next state (101).

Starting from the state (101), if 1RQ is not asserted and 2RQ is asserted, the PLA goes to the loser state (110). If 1RQ is asserted but 2RQ is not asserted, the PLA goes to the state (111) and is given a grant.

Consider the following example together with the state diagram. In the example, five modules have requests during the current time-order slot. They have each been assigned a unique logical module number as indicated below. Each module of course has its own instance of the arbiter state machine. Note that when RQOUT is asserted by the arbiter machine, the resulting changes in levels of RQ# and CONT# are not seen by the machine until the next cycle because of the delays in buffering and the or-tied lines. The letters in the diagram refer to the following states in the arbiter machine: I-Idle; A-Arbitrating; H-Hold; L-Loser.

wait for someone to get a grant (RQ & CONT#) before it is able to go to the idle state and be eligible to arbitrate again.

(4) At Cycle 4, there is still contention, so looking at their third MSB, module 1 goes to hold and module 5 returns to arbitrating and asserts RQOUT alone (RQ# & LMODBIT [0]=RQOUT, NEXT BIT).

(5) At Cycle 5, no contention is seen; therefore, module 5 gets a grant (CONT#=grant), goes to the idle state, and drops out of contention, while module 1 returns to idle from hold (RQ & CONT#), and modules 2, 3, and 4 return to idle from Loser (RQ & CONT#) to start the arbitration process over again.

(6–9) During Cycles 6 through 9, the remaining modules, 1–4, arbitrate again, this time in the absence of module 5. Finally module 1 wins the grant.

(10–14) During Cycles 10 through 14, the remaining modules, 2–4, arbitrate for the next grant. In Cycle 13, both modules 2 and 4 go to the hold state, both having ones in their logical module numbers, leaving no one to arbitrate. This situation is called a "standoff." In this case all modules in the hold state go to their next bit in their logical module numbers. If there is a zero there, then that module asserts RQOUT and returns to arbitrating (RQ# & LMODBIT [0]=RQOUT, NEXT BIT). If there is a one there, then that module waits in hold (RQ# & LMODBIT [1]=NEXT BIT). The purpose of the hold state is to take care of the standoff condition.

(15–19) During the remaining cycles, the last two modules arbitrate and receive grants. When a grant is given to a request, the module representing the granted request pushes a one onto its grant queue (412). All other modules push zeros onto their grant queues.

When all of the requests at the top of the respective time-ordered queues in the modules have been given

| Module | Logical Module # | Arbitration Cycle | | | | | | | | | | | | | | | | | | |
|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 |
| 1 | 001000 | I | A | A | A | H | I | A | A | A | — | — | — | — | — | — | — | — | — | — |
| 2 | 010000 | I | A | A | H | L | I | A | A | H | I | A | A | H | A | — | — | — | — | — |
| 3 | 100000 | I | A | H | L | L | I | A | H | L | I | A | H | L | L | I | A | H | I | A |
| 4 | 011000 | I | A | A | H | L | I | A | A | H | I | A | A | H | L | I | A | A | — | — |
| 5 | 000100 | I | A | A | A | A | — | — | — | — | — | — | — | — | — | — | — | — | — | — |
| GRANT: | | | | | | 5 | | | | 1 | | | 2 | | | 4 | | | 3 | |
| | | | | | | | | | | | | | | | | | | | | BACOM |

(1) At Arbitration Cycle 1, all arbiter machines in the modules are in the idle state (ARBREQ# & CONT#). After receiving an arbitration request (ARBREQ) from their respective time-ordered queues, they all assert RQOUT and proceed to the arbitrating state (ARBREQ & CONT#=RQOUT).

(2) At Cycle 2, both RQ# and CONT# are asserted indicating that there is contention. At this point all arbiters look at the MSB of their logical module number. Those with zeros stay in the arbitrating state and assert RQOUT (CONT & LMODBIT [1]=RQOUT, NEXT BIT) and those with ones go to the Hold state (CONT & LMODBIT [0]=NEXT BIT). In the example, only module 3 had a one in the MSB of its number and had to go to Hold.

(3) At Cycle 3, modules 1, 2, 4 and 5 see that there is contention and therefore look at the next MSB to see what to do. Modules 2 and 4 have ones in the second MSB and therefore head to Hold. Module 3, which was in Hold, sees that there were more requests made (RQ# & CONT#) and goes to the loser state. It will have to grants by the arbiter, each module's arbiter generates an intenal signal called BACOM (Binary Arbitration COMplete). BACOM causes the time-ordered queue to pop and introduces the next time-order slot to begin binary arbitration anew.

The grant queue (412) is a three-deep FIFO which is used to buffer granted requests waiting for bus time. Unlike the time-ordered queue, the grant queue has only one request at the head of the queue in one of the modules at any one time. The request at the head of the grant queue is guaranteed to be the next request to go out onto the bus. After the request has been made, then it is popped off of the grant queue. The purpose of the grant queue is to allow the arbiter to proceed independently of and in parallel with the bus access protocol and to get as much as three grants ahead of the bus. As long as the arbiter can generate grants as fast or faster than the bus can use them, all of the internal delays due to both time ordering and binary arbitration will not introduce delays or dead cycles onto the bus. While the bus is busy with a particular request, the arbiter is able to work in parallel on generating a grant for a request to be put on the bus at a future time. The bus rarely needs to wait for a grant. The bus for handling data, address and control information forms no part of the present invention and therefore is not described herein. Any of many well known buses and bus protocols may be employed, one such bus is described in the above-referenced copending application Ser. No. 336,866, of David Budde et al.

SUMMARY

What has been described is an arbitration mechanism comprising a request FIFO (408) for storing request status information (ones and zeros) corresponding to received requests in the order that they are made. A one indicates that the request was made by the module in which the FIFO is located, and a zero indicates that the request was made by one of the other modules. The request status information from the other modules is received over the NREQ# signal line connected between the modules. This logic separates multiple requests into time-ordered slots, such that all requests in a particular time slot may be serviced before any requests in the next time slot.

A store (409) stores a unique logical module number. An arbiter (410) examines this logical number bit-by-bit in successive cycles and places a one in grant queue (412) upon the condition that the bit examined in a particular cycle is a zero and signals this condition over the RQOUT signal line. If the bit examined in a particular cycle is a one, the arbiter drops out of contention and signals this condition over the RQ0UT line. This logic orders multiple requests within a single time slot, which requests are made by multiple modules, in accordance with the logical module numbers of the modules making the requests.

The grant queue (412) stores status information (ones and zeros) corresponding to granted requests in the order that they are granted—a one indicating that the granted request was granted to the module in which the grant queue is located, and a zero indicating that the granted request was granted to one of the other modules. The granted request status information from the other modules is received over the RQ# and CONT# signal lines. This logic separates multiple granted requests such that only one request corresponding to a particular module is at the head of any one grant queue at any one time.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. An arbitration mechanism for use in combination with a microprocessor multiline bus interface; said interface including a bus to which a number of modules are connected in parallel, and signaling means connected between said modules for signaling between said modules; each one of said modules being assigned a unique local module number; said arbitration mechanism providing the means for granting access to said bus to one of said modules in response to a request for access to said bus, said arbitration mechanism in each of said modules comprising:

a PLA state machine configured as a request FIFO for storing received requests in the order that they are made; and, arbiter means responsive to said request for access to said bus and to said signaling means connected between said modules, for keeping multiple requests separated into time-order slots in said FIFO such that all requests made by multiple modules, in a particular time-order slot, are serviced before any requests in the next time-order slot.

2. The combination in accordance with claim 1 further comprising:

logical module number storing means for storing said unique logical module number;

a NREQOUT output line from said module, connected through a first constant current source to said NREQ# line, such that said NREQOUT line being asserted will cause said NREQ# line to be asserted;

a REQOUT output line from said module, connected through a second constant current source to said REQ# line, such that said REQOUT line being asserted will cause said REQ# line to be asserted, said REQOUT line being further connected through a third constant current source to said CONT# line, such that said REQOUT line being asserted in addition to a REQOUT line from another one of said modules being asserted will cause said CONT# line to be asserted;

a grant queue;

arbitration means responsive to said REQ# line, said REQOUT line, and said CONT# line, for ordering said multiple requests which are within a single time-order slot in accordance with the logical module numbers of the modules making the requests, said means including means for placing said requests in said grant queue such that only one request corresponding to a particular module is at the head of the grant queue at any one time;

means within each of said modules connected to said NREQ# line, said REQ# line, and said CONT# line and to said logical module number storing means, for examining said logical module number, bit-by-bit in successive cycles and for generating a grant signal upon the condition that said RQ# line is unasserted and a bit in said logical module number is in a predetermined state.

3. An arbitration mechanism for use in combination with a bus to which a number of modules are connected in parallel, each one of said modules being assigned a unique logical module number and including therein an arbitration mechanism, said arbitration mechanism providing the means for granting exclusive use of said but to one of said number of modules in response to a received request for access to said bus, said arbitration mechanism in one of said modules comprising:

signaling means connected between said modules for signaling between said modules;

a PLA machine configured as a request FIFO for storing new request status information corresponding to received requests in the order that they are made, a first state of said new request status information indicating that the request was made by said one module, and a second state of said new request status information indicating that the request was made by one of said other modules, said second new request status information being received by said one module over said signaling means for signaling between said modules, whereby multiple requests are separated into time-order slots such that all requests relating to said plurality of modules in a particular time-order slot may be serviced before any requests in the next time-order slot;

logical module number storing means for storing said unique logical module number;

a grant queue for storing granted request status information corresponding to granted requests in the order that they are granted, a first state of said granted request status information indicating that the granted request was granted to said one module, and a second state of said granted request status information indicating that the granted request was granted to one of said other modules, said second granted request status information being received by said one module over said signaling means for signaling between said modules, whereby multiple granted requests are separated such that only one request corresponding to a particular module is at the head of said grant queue at any one time; and, arbitration means connected to said request FIFO, to said logical module number storing means, to said grant queue, and to said signaling means, for examining said logical number bit-by-bit in successive cycles, said arbitration means including means for placing a one in said grant queue upon the condition that a bit examined in a particular cycle is of a predetermined value and for signaling this condition over said signaling means, whereby multiple requests which are within a single time-order slot, are ordered in said grant queue by said arbitration means in accordance with the logical module numbers of the modules making the requests, such that only one request corresponding to a particular module is at the head of said grant queue at any one time.

4. The combination in accordance with claim 1 or claim 3 wherein said signaling means for signaling between said modules includes:

an NREQ# input line to said module;

an NREQOUT output line from said module, connected through a first constant current source to said NREQ# line, such that said NREQOUT line being asserted will cause said NREQ# line to be asserted;

a RQ# input line to said module;

a CONT# input line to said module; and, a RQOUT output line from said module, connected through a second constant current source to said RQ# line, such that said RQOUT line being asserted will cause said RQ# line to be asserted, said RQOUT line being further connected through a third constant current source to said CONT# line, such that said REQOUT line being asserted in addition to a REQOUT line from another one of said modules being asserted will cause said CONT# line to be asserted.

5. The combination in accordance with claim 4 wherein said arbiter means includes decoder means connected to line, said RQ# line, and said CONT# line and to said logical module number storing means, for decoding said lines to provide that, upon the first condition that RQ# and CONT# are not asserted, no module is making a request, upon the second condition that RQ# is asserted and CONT# is not asserted, one module is making a request, and upon the third condition that RQ# is asserted and CONT# is asserted, two or more modules are making a request, said arbiter further including means for asserting said grant signal in response to said NREQOUT signal and said second condition, and for asserting said grant signal in response to said NREQOUT signal and said third condition, and upon the further condition that a bit in said logical module number is in a predetermined state.

6. An arbitration mechanism comprising:

a PLA machine configured as a request FIFO for storing request status information, ones and zeros, corresponding to received requests in the order that they are made, a one indicating that the request was made by the module in which the FIFO is located, and a zero indicating that the request was made by one of the other modules; the request status information from the other modules being received over a NREQ# signal line connected between the modules, whereby multiple requests are separated into time-ordered slots, such that all requests in a particular time slot may be serviced before any requests in the next time slot;

a grant queue;

a store for storing a unique logical module number; and, an arbiter connected to said request FIFO, to said store and said grant queue for examining said logical number bit-by-bit in successive cycles, said arbiter including first means for placing a one in said grant queue upon a first condition that the bit examined in a particular cycle is a zero;

said arbiter including second means for placing a zero in said grant queue upon the second condition that the bit examined in a particular cycle is a one whereby the arbiter drops out of contention;

said arbiter including means for signaling said first and second conditions over a RQOUT signal line;

said grant queue including means for storing status information, ones and zeros, corresponding to granted requests in the order that they are granted, a one indicating that the granted request was granted to the module in which the grant queue is located, and a zero indicating that the granted request was granted to one of the other modules;

whereby multiple requests within a single time slot, which requests are made by muliple modules, are ordered in accordance with the logical module numbers of the modules making the requests, and whereby multiple granted requests are ordered such that only one request corresponding to a particular module is at the head of said grant queue at any one time.

* * * * *